United States Patent
Zhang et al.

(10) Patent No.: US 7,929,584 B2
(45) Date of Patent: Apr. 19, 2011

(54) LIGHT SOURCE MODE ALIGNMENT DEVICE AND METHOD, PASSIVE OPTICAL NETWORK SYSTEM

(75) Inventors: Xuliang Zhang, Shenzhen (CN); Jun Zhao, Shenzhen (CN); Tao Jiang, Shenzhen (CN); Wei Huang, Shenzhen (CN); Huafeng Lin, Shenzhen (CN); Yuntao Wang, Shenzhen (CN); Guo Wei, Shenzhen (CN); Jun Chen, Shenzhen (CN); Feng Wang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 115 days.

(21) Appl. No.: 12/367,822

(22) Filed: Feb. 9, 2009

(65) Prior Publication Data

US 2009/0175303 A1    Jul. 9, 2009

Related U.S. Application Data

(63) Continuation-in-part of application No. PCT/CN2007/070398, filed on Aug. 1, 2007.

(30) Foreign Application Priority Data

Aug. 10, 2006 (CN) .......................... 2006 1 0062091

(51) Int. Cl.
*H01S 3/10* (2006.01)

(52) U.S. Cl. ................ 372/26; 372/29.015; 372/29.023; 372/34

(58) Field of Classification Search .................... 372/26, 372/29.015, 29.023, 34
See application file for complete search history.

(56) References Cited

FOREIGN PATENT DOCUMENTS

| | | |
|---|---|---|
| CN | 1280310 A | 1/2001 |
| CN | 1300123 A | 6/2001 |
| CN | 1444349 A | 9/2003 |
| CN | 1554139 A | 12/2004 |
| CN | 1909419 A | 2/2007 |
| CN | 101026417 A | 8/2007 |
| GB | 2 143 075 A | 1/1985 |
| JP | 3-222486 | 10/1991 |

OTHER PUBLICATIONS

International Search Report issued in corresponding PCT Application No. PCT/CN2007/070398; mailed Nov. 8, 2007.

*Primary Examiner* — Dung T Nguyen
(74) *Attorney, Agent, or Firm* — Brinks Hofer Gilson & Lione

(57) ABSTRACT

A light source mode alignment device and method and a passive optical network system are provided. The device includes a laser and a temperature control unit connected to each other and further includes a signal processing unit. The laser converts an incident light into a current signal. The current signal is amplified and converted into a voltage signal via a transimpedance amplifier. Together with a modulation signal generated by the signal processing unit, the voltage signal adjusts a bias voltage of the temperature control unit.

21 Claims, 15 Drawing Sheets

LIGHT SOURCE MODE ALIGNMENT DEVICE AND METHOD, PASSIVE OPTICAL NETWORK SYSTEM

CROSS REFERENCE TO RELATED APPLICATIONS

The application is a continuation-in-part application of PCT/CN2007/070398, filed on Aug. 1, 2007, which claims the benefit of priority to Chinese Patent Application No. 200610062091.7, entitled "Light Source Self-adapting Mode Alignment Device and Method" and filed on Aug. 10, 2006, both of which are incorporated herein by reference in their entirety.

FIELD OF THE TECHNOLOGY

The present disclosure relates to the field of optical communication, and more particularly to a light source mode alignment device, a light source mode alignment method, and a passive optical network system.

BACKGROUND OF THE DISCLOSURE

Currently, with the rapid development of video services, subscribers have an increasingly high demand for the bandwidth. Although the 2 Mbps bandwidth of a digital subscriber line (DSL) is sufficient for the current data transmission services, it is difficult to satisfy the video services. A new broadband access network, such as an Ethernet Passive Optical Network (EPON) and a Gigabit Passive Optical Network (GPON), further promotes the bandwidth of the access network. However, because the time division multiplexing and burst mode technologies are employed, the cost of the system is rather high. Moreover, the bandwidth for a single subscriber merely increases slightly, because all subscribers share the bandwidth. With the development of the video services, especially the demand for high definition video services, an access network with a higher bandwidth is needed. A wavelength division multiplexer passive optical network (WDM-PON) not only inherits the bandwidth characteristic of a WDM network but also has the low cost characteristic of a passive optical network (PON), which thus is focused by many companies, standard organizations, and research institutions. Prototypes of the WDM-PON have been developed in many companies and the formulation of standards has been put on the agenda. However, on the whole, the WDM-PON is not very mature and needs to be improved in many aspects, for example, colorless light source, temperature compensation, network upgrade, and so on. The colorless light source is mainly employed to reduce the maintenance cost of the network and simplify the network management. Nowadays, the colorless light source mainly includes an injection-locked Fabry Perot laser diode (FP-LD), a reflecting semiconductor optical amplifier (RSOA), and a superluminescent light emitting diode (SLED). Among the three light sources, the injection-locked FP-LD has the lowest cost and is most likely to be popularized. However, the FP-LD has multiple longitudinal modes. If the wavelength of the incident light cannot be aligned with one of the longitudinal modes, a threshold of the incident light is increased, and an output optical power of the FP-LD is significantly lower than that achieved at the moment of the alignment. Moreover, the mode varies with the changing of the external temperature, so that the output optical power is changed to a great extent.

FIG. 1 is an injection-locked FP-LD technical solution in the prior art. A broad-band light emitted from a broad-band light source 10 enters a wavelength division demultiplexer (DMUX) 12 via a circulator 11. The spectrum of the broad-band light is divided by the DMUX 12 into many narrow-band lights. The narrow-band light with a different wavelength is output from each channel of the DMUX 12 and incident upon a corresponding FP-LD laser 13. The FP-LD 13 outputs a light with the same wavelength as that of the incident light and suppresses lights with the other wavelengths. A signal may be loaded into the output light of the FP-LD 13 by modulating a driving current of the FP-LD 13. The lights of all FP-LDs 13 are combined into a multi-channel WDM signal via a wavelength division multiplexer (MUX, the same element as the DMUX) and then output via the circulator 11.

As shown in FIG. 2, a structure of a common FP-LD laser assembly in the prior art includes an FP-LD chip 21, a monitor photo detector (MPD) 22, and an amplifier 23 (optional). To ensure a constant output power, the reflection at a rear end surface of the FP-LD chip is not ideal total reflection but has a loss, so that a part of laser energy sent by the FP-LD chip is incident upon the MPD located behind the end surface via the end surface. In fact, the MPD is a photodiode capable of converting the incident laser into a current and outputting the current, and then the current is amplified by the amplifier to serve as a feedback input to a laser driver chip, thereby ensuring that the FP-LD laser outputs a constant optical power. In addition, the changing of temperature influences the output power and wavelength of the laser greatly. In order to further ensure the stable power and wavelength, the laser assembly usually further includes a thermoelectric cooler (TEC) and a thermistor 24 (of negative temperature coefficient). A temperature-controlling current is adjusted according to a temperature of the laser diode (LD) measured by the thermistor to realize a closed loop negative feedback, so that the LD maintains a constant temperature, thereby ensuring the stable power and wavelength.

The FP-LD is a multi-longitudinal mode laser and usually has a low side mode suppression ratio (SMSR) (a ratio of a power of a main mode to that of a neighbor mode). When the wavelength of the incident light corresponds to a center of the main mode and when it corresponds to a valley between the modes, the output optical powers are significantly different from each other. Due to a drift of an arrayed wavelength grating (AWG) channel and FP-LD temperature, as well as the inconsistency between the FP-LD longitudinal modes, the output power of the FP-LD is random, and when the incident light corresponds to the valley of the longitudinal mode, a threshold of the injection locking is increased and the output power of the FP-LD is lower. In order to solve the problems caused by the mode misalignment, one common solution is to coat an anti-reflection film on a front end surface of the FP-LD to weaken the modes of the FP-LD, which nevertheless introduces a large power penalty. In the technical solution of the prior art, if the reflectivity of the front end surface is reduced to 1%, the modes of the FP-LD are weakened. However, the mismatch between the modes of −0.2 nm and +0.07 nm results in a power penalty of 3 dB. In addition, during the actual implementation, the inventors found that, if a specific wavelength calibration is not performed on each FP-LD, the mismatch of the modes may occur to a great extent, which results in a difference between optical network units (ONUs), thereby further affecting the reliable operation of the system. On the other aspect, if the wavelength calibration is performed on each FP-LD, the element cost and maintenance cost are greatly increased. If the AWG is not an athermal AWG of a high cost, the common FP-LD wavelength control process is no longer feasible, due to the drift of the AWG channel.

SUMMARY OF THE INVENTION

Accordingly, an embodiment of the present disclosure provides a light source mode alignment device and method, so as to realize an automatic alignment between a wavelength and a longitudinal mode of a laser, thereby ensuring a stable output power of the laser.

An embodiment of the present disclosure provides a passive optical network (PON) system, in which a light source in the PON system outputs a stable power, thereby ensuring a reliable operation of the PON system.

An embodiment of the present disclosure provides a light source mode alignment device in an embodiment. The light source mode alignment device includes a laser and a temperature control unit connected to each other and further includes a signal processing unit. The laser converts an incident light into a current signal. The current signal is amplified and converted into a voltage signal. The voltage signal adjusts a bias voltage of the temperature control unit together with a modulation signal generated by the signal processing unit.

An embodiment of the present disclosure provides a light source mode alignment device in an embodiment. The light source mode alignment device includes a laser and a temperature control unit connected to each other and further includes a photo-electric detector and a signal processing unit. The photo-electric detector converts an optical signal in an output light into a current signal. The current signal is amplified and converted into a voltage signal. The voltage signal adjusts a bias voltage of the temperature control unit together with a modulation signal generated by the signal processing unit.

An embodiment of the present disclosure provides a light source mode alignment method in an embodiment, which includes the following steps. A power fluctuation signal of an incident light of a laser and a temperature modulation signal are generated respectively. A phase relation between the power fluctuation signal of the incident light and the modulation signal is obtained. A bias voltage of the laser is adjusted according to the phase relation.

An embodiment of the present disclosure provides a PON system in an embodiment. The PON system includes an optical line terminal (OLT), an optical distribution network (ODN), and an optical network unit (ONU). The OLT and/or the ONU includes an adaptive mode alignment light source.

The adaptive mode alignment light source includes a laser and a temperature control unit connected to each other and further includes a signal processing unit. The laser converts an incident light into a current signal. The current signal is amplified and converted into a voltage signal. The voltage signal adjusts a bias voltage of the temperature control unit together with a modulation signal generated by the signal processing unit.

An embodiment of the present disclosure provides a PON system in an embodiment. The PON system includes an OLT, an ODN, and an ONU. The OLT and/or the ONU includes an adaptive mode alignment light source.

The adaptive mode alignment light source includes a laser and a temperature control unit connected to each other and further includes a photo-electric detector and a signal processing unit. The photo-electric detector converts an optical signal in an output light into a current signal. The current signal is amplified and converted into a voltage signal. The voltage signal adjusts a bias voltage of the temperature control unit together with a modulation signal generated by the signal processing unit.

In the embodiments of the present disclosure, the automatic alignment (without manual calibration) between the wavelength and the longitudinal mode of the laser is realized at a low cost (a common AWG not limited to an athermal AWG, may be used), so as to compensate influences brought by the temperature variation. Moreover, under the interferences of an optical power drift and a wavelength drift resulted from various factors, the light source mode alignment device according to the embodiment of the present disclosure can still realize the mode alignment, that is because the phase information of the signals is used, which has a strong anti-interference capability. The light source mode alignment device is adopted as a light source in the OLT and/or ONU of the PON system, which is capable of outputting a stable power, thereby ensuring a reliable operation of the PON system.

BRIEF DESCRIPTION OF THE DRAWINGS

The present disclosure becomes more fully understood from the detailed description given herein below for illustration only, and thus is not limitative to the present disclosure, and in which:

FIG. 4(*b*) is a schematic curve diagram of the output power to the modulation current when the wavelength is aligned with a falling edge of the longitudinal mode;

FIG. 4(*c*) is a schematic curve diagram of the output power to the modulation current when the wavelength is aligned with a center of the longitudinal mode;

DETAILED DESCRIPTION OF THE EMBODIMENTS

The present disclosure is described below in detail by reference to the drawings.

Figure 1:
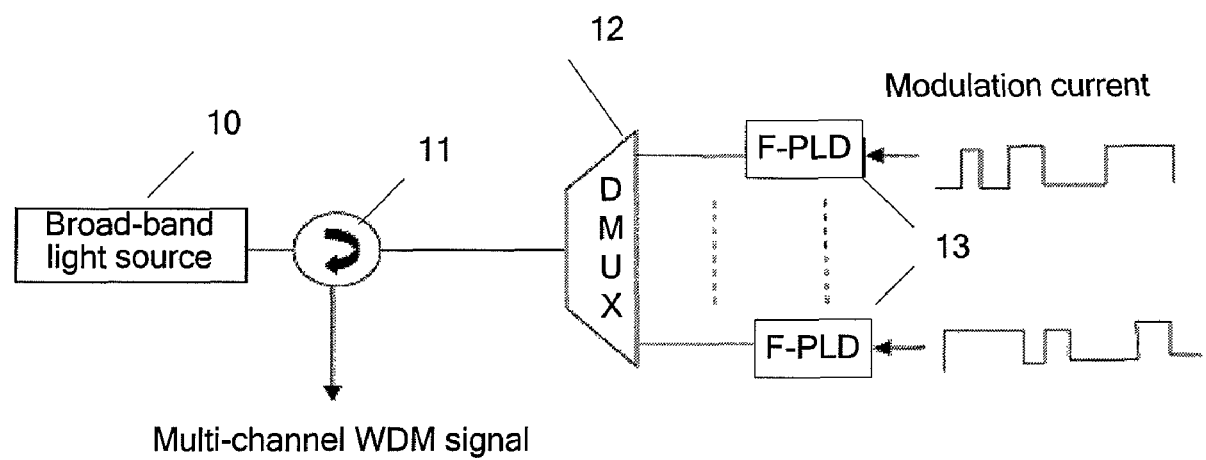
FIG. 1 is a schematic view of an injection-locked FP-LD solution in the prior art.
Figure 2:
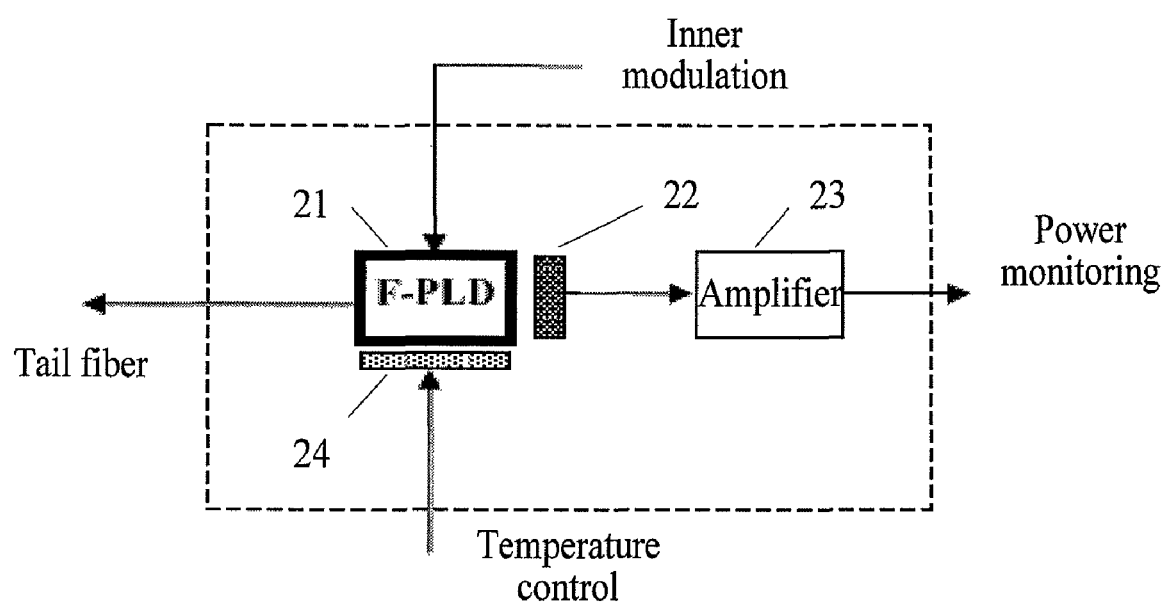
FIG. 2 is a schematic structural view of a common laser in the prior art.

As shown in FIG. 2, an FP-LD laser in the prior art includes an FP-LD chip, a monitor photo detector (MPD) (or a PD), a thermal electric cooler (TEC), a thermistor (of negative temperature coefficient), an amplifier (including a transimpedance amplifier) and the like, which is capable of providing an automatic temperature control (ATC) function and an automatic power control (APC) function. Therefore, in order to realize a closed loop control function for aligning the incident light with the longitudinal mode, a light source alignment device according to an embodiment of the present disclosure further introduces a signal processing function and a feedback control function into the FP-LD laser in the prior art.

First, a relation between an output optical power and a temperature variation of a Fabry Perot laser diode (FP-LD) laser in the prior art is illustrated with reference to FIGS. 3 to 4.

Figure 3:
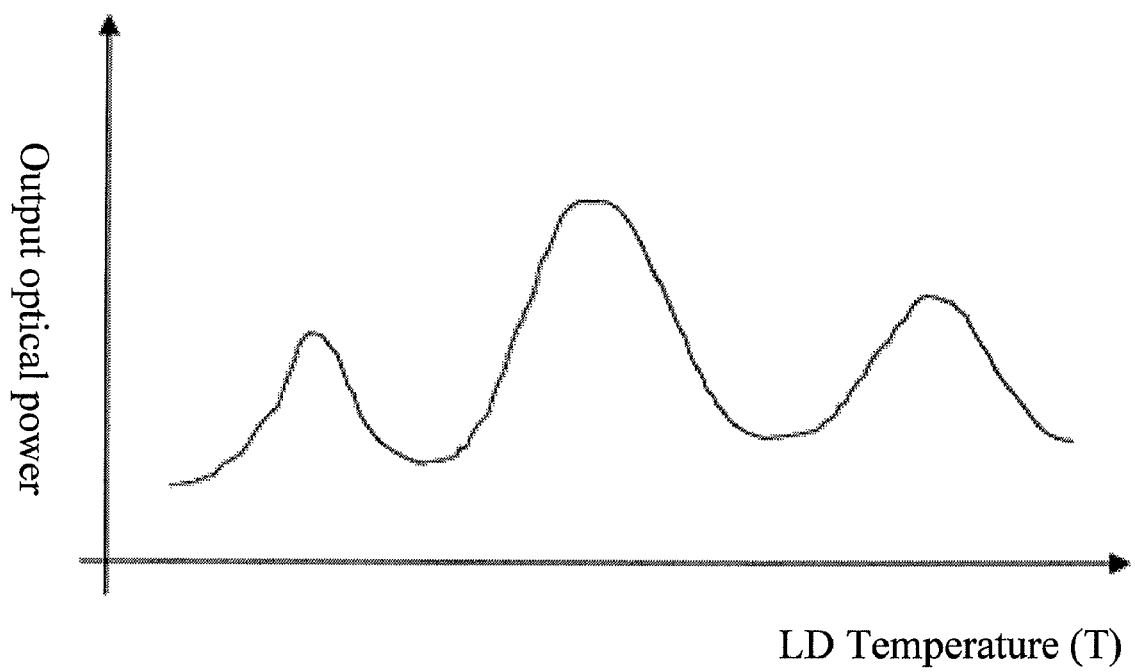
FIG. 3 is a schematic curve diagram of an output optical power to a LD temperature.

FIG. 3 shows a variation of an output optical power with respect to a temperature in the case that a wavelength of an incident light is constant.

When the temperature rises gradually, a longitudinal mode moves towards a longer wavelength direction, and the output optical power varies with a changing of a profile of the longitudinal mode. When a periodical small variation is introduced to the temperature of the laser, and the incident light is not aligned with a center of the longitudinal mode, a wavelength variation induced by the small temperature variation results in a large power fluctuation due to a steep rising or falling edge of the longitudinal mode. If the wavelength of the incident light is on the left of the center of the longitudinal mode, i.e., the wavelength of the incident light is larger than a wavelength of the center of the longitudinal mode, even a very small temperature increase may bring about a large increase of the output power. On the contrary, when the wavelength of the incident light is on the right of the center of the longitudinal mode, i.e., the wavelength of the incident light is smaller than the wavelength of the center of the longitudinal mode, even a very small temperature increase may bring about a large decrease of the output power. Therefore, the temperature adjustment direction may be determined according to a phase relation between a power fluctuation and a temperature modulation signal.

Figure 4A:
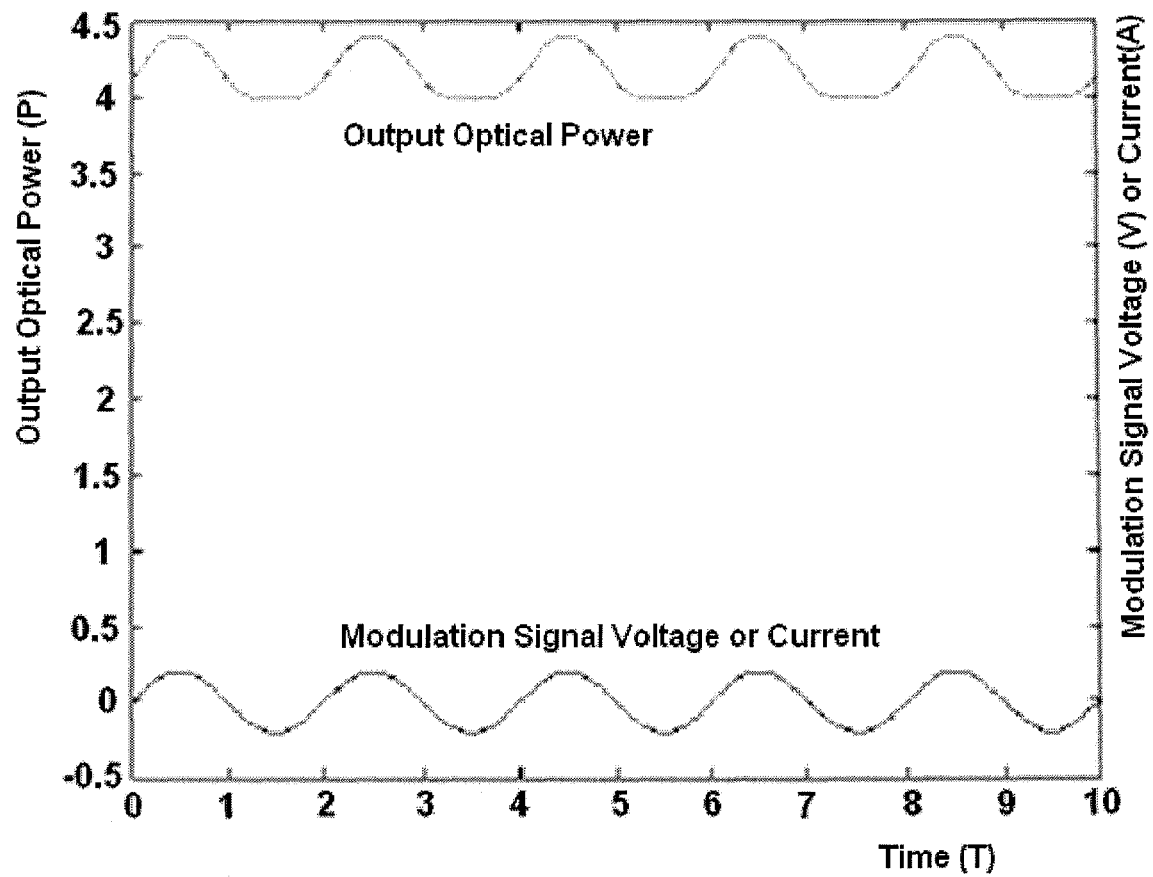
FIG. 4(*a*) is a schematic curve diagram of an output power to a modulation current when a wavelength is aligned with a rising edge of a longitudinal mode.
Figure 4B:
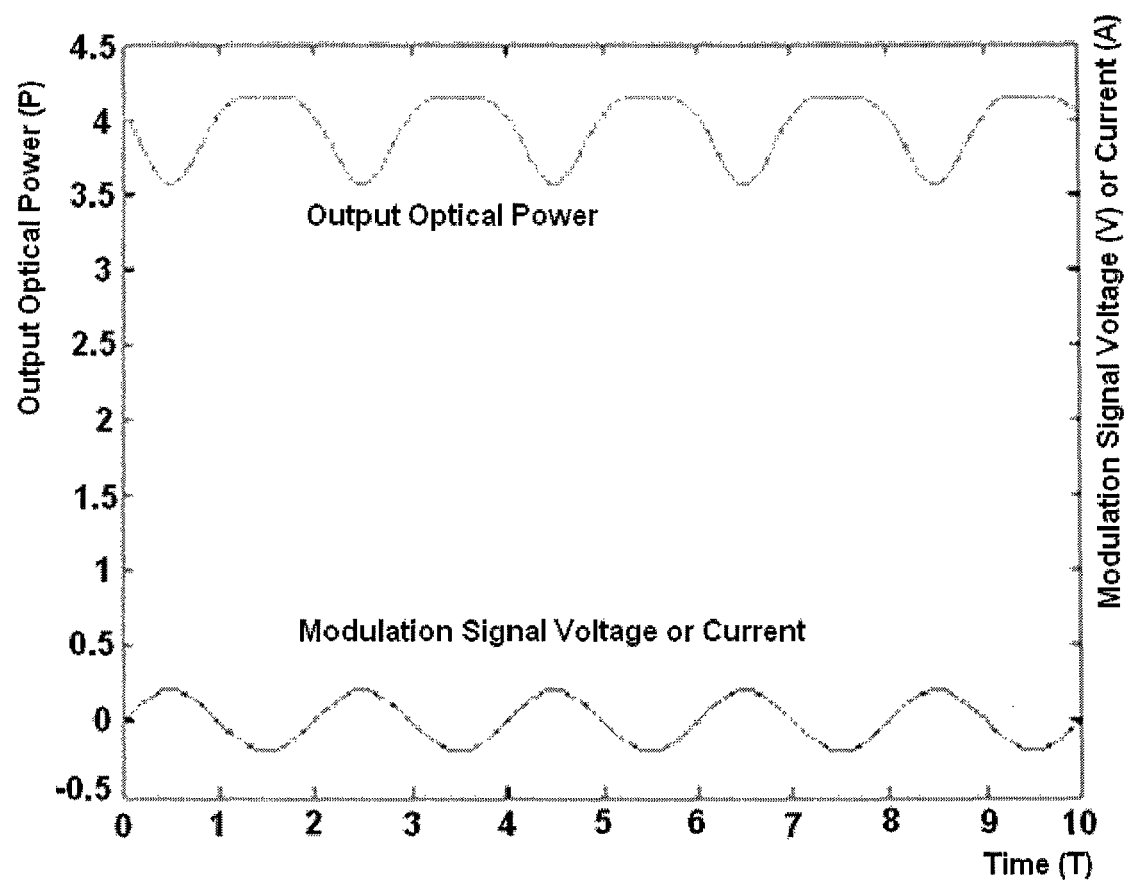
Figure 4C:
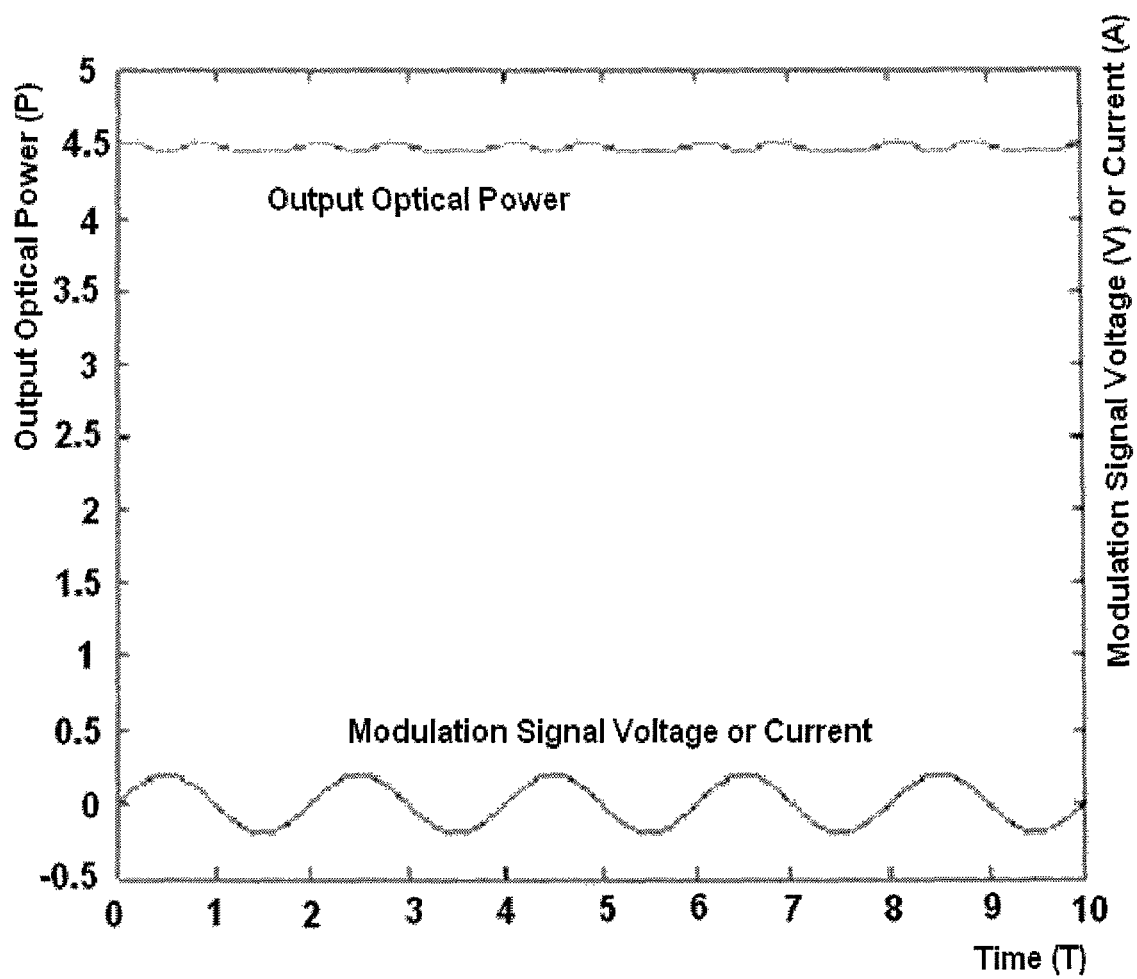

If the incident light is aligned with a rising edge of the longitudinal mode (the profile shown in FIG. 3 is in fact consistent with that of the longitudinal mode), the variation of the optical power and the temperature modulation signal are in phase, as shown in FIG. 4(a). At this time, if a band-pass filter processing is performed on the power fluctuation, a negative voltage of the power fluctuation corresponds to a negative voltage of the modulation signal, and a positive voltage of the power fluctuation corresponds to a positive voltage of the modulation signal, so the integral value of their product (in this disclosure, the integral value of the product of power signal and modulation signal is referred to as IPM, see section "Linear Adjustment Method" below) is greater than zero, and this indicates that the temperature should be adjusted to be higher, i.e., the TEC bias voltage should be increased. On the contrary, if the incident light is aligned with a falling edge of the longitudinal mode, the variation of the optical power and the temperature modulation signal are out of phase, as shown in FIG. 4(b). At this time, after the band-pass filter processing is performed on the power fluctuation, IPM is less than zero, and this indicates that the temperature should be adjusted to be lower, i.e., the TEC bias voltage should be decreased. When the incident light is aligned with the center of the longitudinal mode, IPM is definitely equal to zero, and this indicates that the temperature should be kept unchanged, i.e., the bias voltage of should be kept unchanged; at the same time, the output power will almost keep constant as shown in FIG. 4(c).

Based upon the above principles, the incident light can be precisely aligned with the center of the longitudinal mode by means of monitoring the variation of the IPM and meanwhile adjusting the temperature of FP-LD by proportionally adjusting the TEC bias voltage according to the polarity of the IPM in the following manners.

1) When the IPM is positive, the TEC bias voltage is increased.
2) When the IPM is negative, the TEC bias voltage is decreased.
3) When the IPM is 0, the TEC bias voltage is not adjusted.

The TEC bias voltage may be adjusted through many ways. For example, the bias voltage can be adjusted to an exact value as soon as possible through both a linear adjustment method and a proportional-integral-differential (PID) control method, which are illustrated below in detail.

1) Linear Adjustment Method

As shown in Equation (1), a voltage adjustment amount $\Delta V$ is directly proportional to the IPM:

$$\Delta V = \frac{IPM}{c \cdot t}, \quad (1)$$

where $\Delta V$ is an adjustment amount of the bias voltage; IPM is an integral value of a product of multiplying a twice-amplified power signal by a modulation signal; c is a constant; and t is an adjustment time (the division by t aims at avoiding the algorithm oscillation).

Generally, the longer the adjustment time t is, the smaller the adjustment amount of the voltage is. When $\Delta V$ is adjusted to approach zero, t is reset to 1 to deal with the next large wavelength mismatch.

2) PID Control Method

In the PID control method, the relation between $\Delta V$ (the adjustment amount of the bias voltage) and the IPM is no longer a simple linear proportion relation, but satisfies a relation indicated in Equation (2):

$$\Delta V = A \cdot IPM + B \cdot \frac{d}{dt}(IPM) + C \cdot \int_{t0}^{t} IPM\, dt, \quad (2)$$

where A, B, and C are all constants.

It should be noted that, the modulation signal generated by a modulator applied to a TEC bias voltage is a small-amplitude low-frequency signal, and the selection of the amplitude is relevant to a line width of the FP-LD longitudinal mode. The selection criteria is when the incident light is at a central position of the longitudinal mode, the amplitude of modulation signal should almost causes no variation of the output optical power of FP-LD. The low frequency is adopted to avoid the interferences on high-frequency digital signals. Generally, the lower the response frequency is, the lower the cost of a photo-electric detector (PD) is, and the higher the sensitivity is.

The light source mode alignment devices according to embodiments of the present disclosure are respectively described below. For the convenience of explanation, the MPD refers to a backward light photo-electric detector of the laser and the PD refers to an external photo-electric detector of the laser without special explanation.

In the light source mode alignment device according to an embodiment of the present disclosure, an backward light is converted into a current signal by a laser; the current signal is amplified and converted into a voltage signal by a transimpedance amplifier; a modulation signal is generated by a modulator; and the total control voltage of TEC is the addition complex of the TEC bias voltage and modulation signal. The temperature control unit includes a TEC, a thermistor, and a temperature-controlling driver.

1) A First Embodiment: An Analog Signal Processing Unit and an MPD Inside a Laser are Employed.

Figure 5:
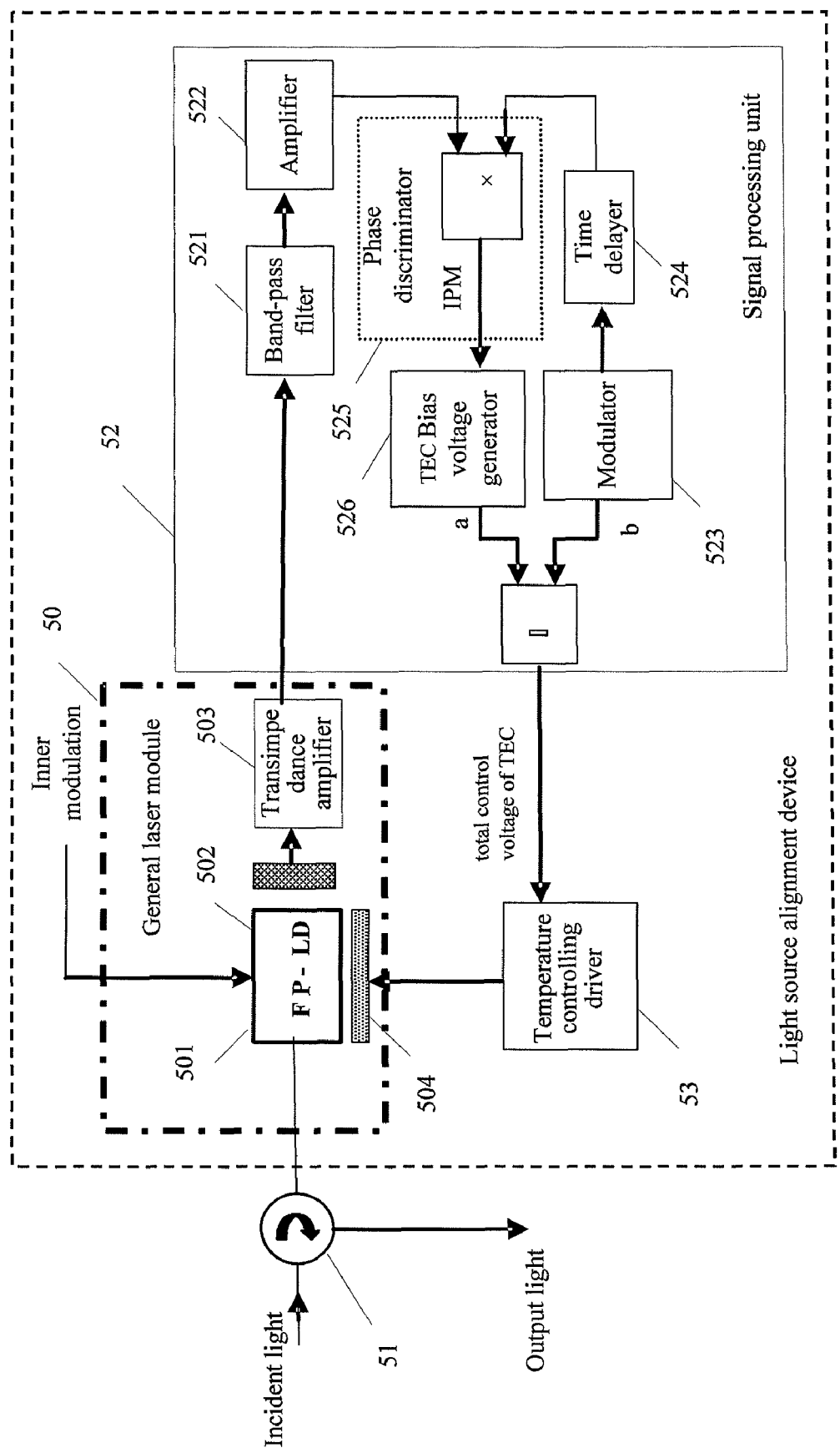
FIG. 5 is a structural view of a light source mode alignment device according to a first embodiment of the present disclosure.

FIG. 5 is a structural view of a light source mode alignment device according to a first embodiment of the present disclosure.

An incident light enters an FP-LD 501 in a general laser module 50 via a circulator 51. The FP-LD 501 as an optical pump excites an FP-LD chip to generate a laser. One part of the laser (a large part of the energy) is emitted outwards via a front end surface of the FP-LD chip to form an output light, and the other part forms a back light of the laser via a rear end surface of the FP-LD chip. The back light is detected and converted into a current signal by an MPD 502. The current signal is amplified into a voltage signal by a transimpedance amplifier 503 located in the general laser module 50. Then, the voltage signal is transmitted to a signal processing unit 52. In this embodiment, the signal processing unit 52 is realized by an analog circuit, and the specific processing is described as follows.

In the signal processing unit 52, first, a band-pass filter 521 performs a band-pass filtering (to remove a DC component) on the voltage signal with a frequency of a modulation signal of a temperature-controlling current as a central frequency, to filter an interference signal of an optical power variation caused by various factors and the DC component in the voltage signal, so as to obtain a voltage signal containing power fluctuation information of the output light. Then, an amplifier 522 dynamically amplifies the filtered voltage signal to obtain a voltage signal, which enables an output signal to have the same amplitude as that of the modulation signal (a power variation voltage signal with a consistent amplitude).

A modulator 523 in the signal processing unit 52 generates a modulation signal. The modulation signal is delayed (to compensate a time difference between the temperature-controlling current and a wavelength response) by a time delayer 524, and then enters a phase discriminator 525 together with the above power variation voltage signal with a consistent amplitude after being amplified. The phase discriminator 525 is constituted by a multiplier and an integrator. An integral value IPM of a product of multiplying the two signals (which reflects a phase relation between the two signals) is output to a TEC bias voltage generator 526 to adjust a bias voltage for temperature control. The specific adjustment manner can be obtained with reference to the above descriptions.

The bias voltage output by the TEC bias voltage generator 526 and the modulation voltage generated by the modulator 523 produce a voltage through a weighted addition operation. Then, the voltage is applied to a TEC 504 of the general laser module 50 via a temperature-controlling driver 53 to control a temperature of the FP-LD, so that a longitudinal mode of the FP-LD moves towards a direction aligned with a wavelength of the incident light, thereby finally realizing the alignment between the incident light and a center of the longitudinal mode.

In addition, if an attenuation of 3 dB is not considered, the circulator in FIG. 5 may be replaced by a 1×2 bi-directional coupler.

The adaptive mode alignment light source may be realized by the analog circuit or by a digital signal processing method through sampling power values detected by the PD.

2) A Second Embodiment: A Digital Signal Processing Unit and an MPD are Employed.

Figure 6:
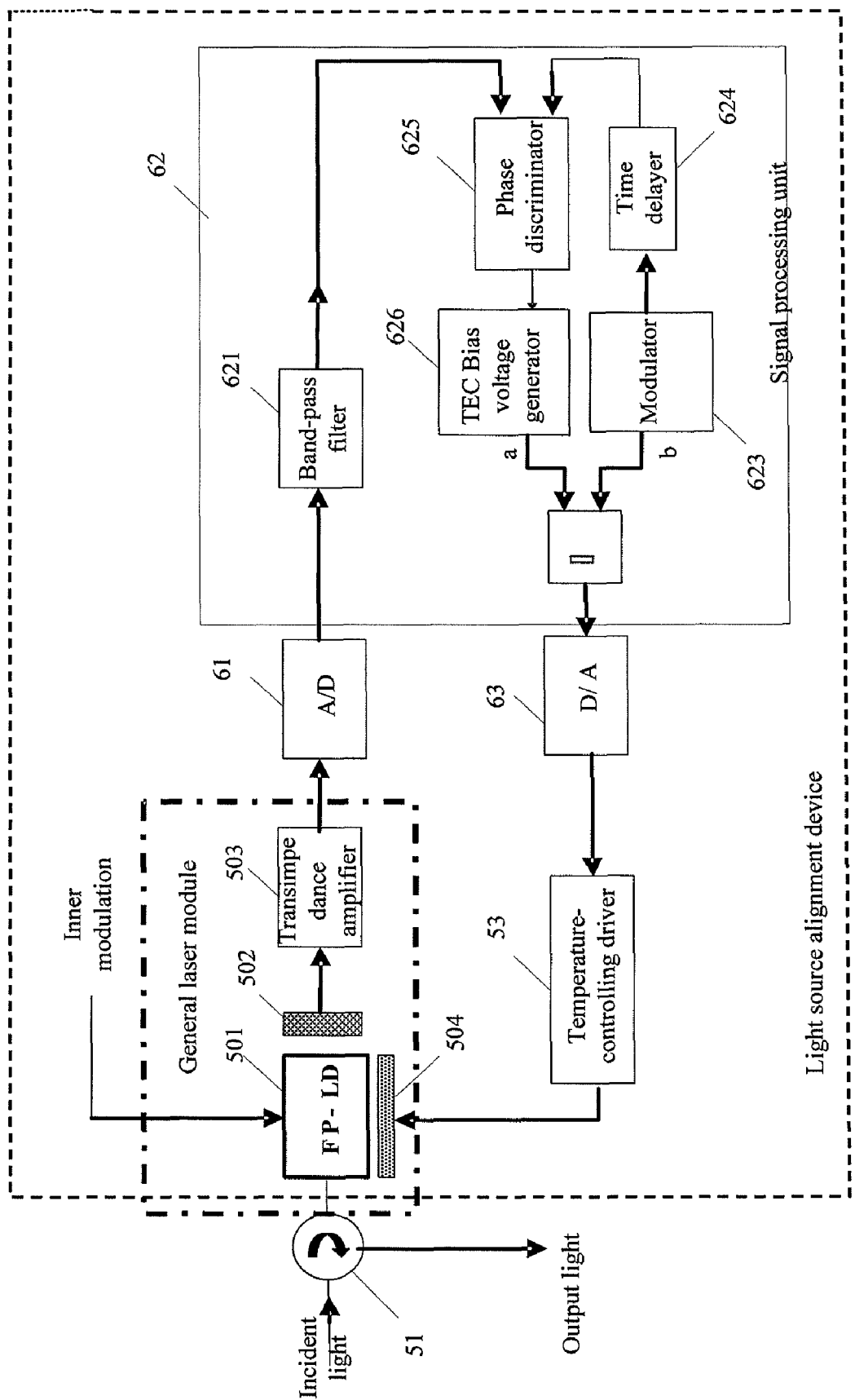
FIG. 6 is a structural view of a light source mode alignment device according to a second embodiment of the present disclosure.

FIG. 6 is a structural view of a light source mode alignment device according to a second embodiment of the present disclosure.

This embodiment is basically the same as the first embodiment shown in FIG. 5, but the difference there-between merely lies in that, the signal processing unit is implemented by a digital circuit in this embodiment.

As shown in FIG. 6, a voltage signal output by a general laser module 50 for reflecting a backlight power is sent to an A/D module 61 for sampling to obtain a digitized power signal. Afterwards, the digitized power signal is sent to a signal processing unit 62 for a digital signal processing. The processing on the digitized power signal performed by the signal processing unit 62 is consistent with the analog processing shown in FIG. 5. The difference there-between lies in that, all processing in this embodiment is digitized processing, whereas the processing shown in FIG. 5 is analog processing.

The signal processing unit 62 processes the digitized power signal as follows.

First, a band-pass filter 621 performs a band-pass filtering (to remove a DC component) on the voltage signal with a frequency of a modulation signal of a temperature-controlling current as a central frequency, to filter an interference signal of an optical power variation caused by various factors and the DC component in the voltage signal, so as to obtain a voltage signal containing power fluctuation information of the output light. Then, an amplifier 622 dynamically amplifies the filtered voltage signal to obtain a voltage signal, which enables an output signal to have the same amplitude as that of the modulation signal (a power variation voltage signal with a consistent amplitude).

A modulator 623 in the signal processing unit 62 generates a modulation signal. The modulation signal is delayed (to compensate a time difference between the temperature-controlling current and a wavelength response) by a time delayer 624, and then enters a phase discriminator 625 together with the above power variation voltage signal with a consistent amplitude after being amplified. The phase discriminator 625 is constituted by a multiplier and an integrator. An integral value IPM of a product of multiplying the two signals (which reflects a phase relation between the two signals) is output to a TEC bias voltage generator 626 to adjust a bias voltage for temperature control. The specific adjustment manners can be obtained with reference to the above descriptions.

The bias voltage output by the TEC bias voltage generator 626 and the modulation voltage generated by the modulator 623 produce a voltage through a weighted addition operation, and then the voltage is converted into an analog signal by a D/A module 63 and enters a temperature-controlling driver 53. Then, the analog signal is applied to a TEC 504 of the general laser module 50 via the temperature-controlling driver 53 to control a temperature of the FP-LD, so that a longitudinal mode of the FP-LD moves towards a direction aligned with a wavelength of the incident light, thereby finally realizing the alignment between the incident light and a center of the longitudinal mode.

In addition, if an attenuation of 3 dB is not considered, the circulator in FIG. 6 may be replaced by a 1×2 bi-directional coupler.

In the light source mode alignment device according to the embodiment of the present disclosure, a PD may convert an optical signal in an output light of the laser into a current signal. The current signal is amplified and converted into a voltage signal by a transimpedance amplifier. A modulation signal is generated by a signal processing unit. The voltage signal adjusts a bias voltage of a temperature control unit together with the modulation signal. The temperature control unit includes a TEC, a thermistor, and a temperature-controlling driver.

3) A Third Embodiment: An Analog Signal Processing Unit and a PD are Employed.

Figure 7:
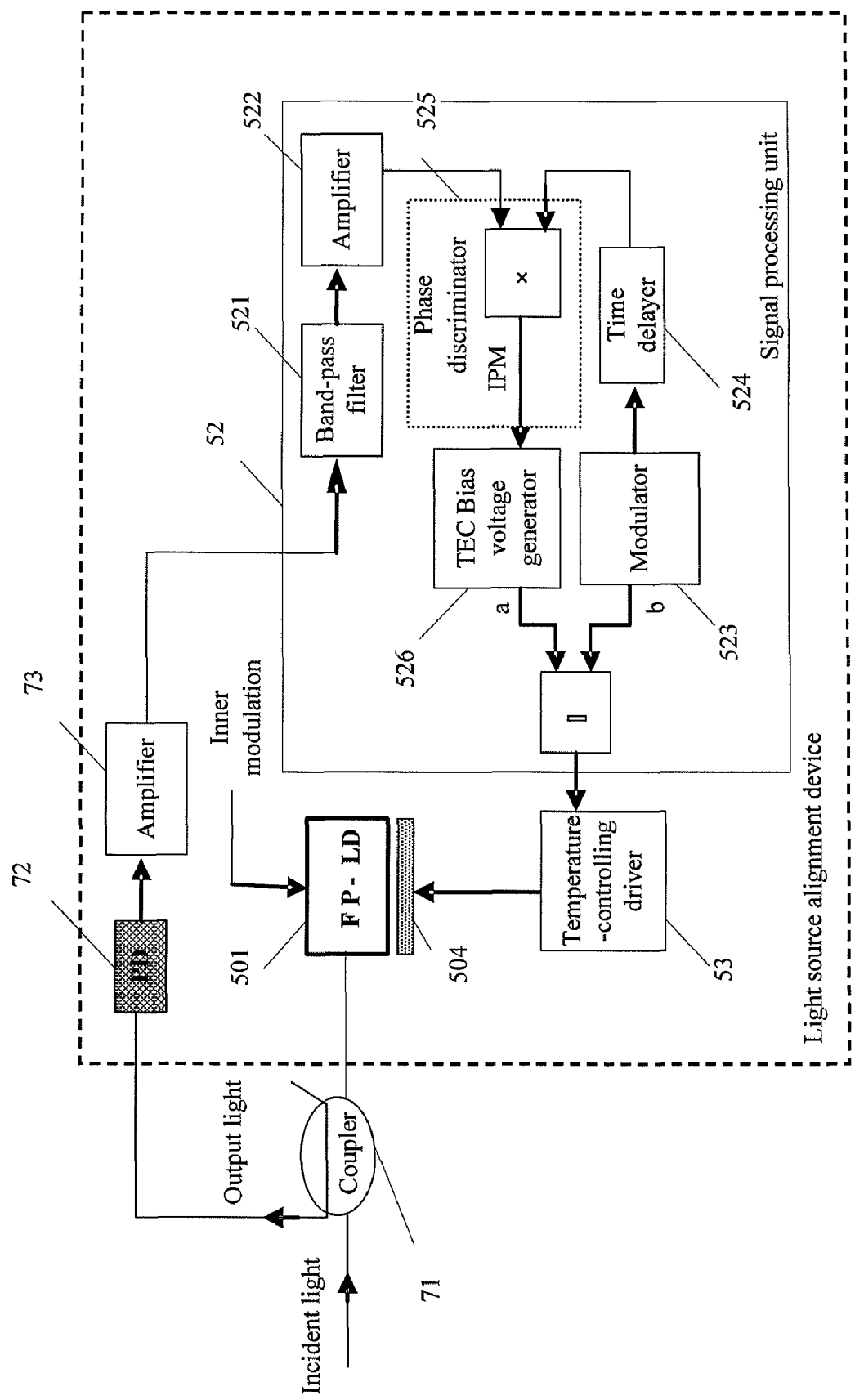
FIG. 7 is a structural view of a light source mode alignment device according to a third embodiment of the present disclosure.

FIG. 7 is a structural view of a light source mode alignment device according to a third embodiment of the present disclosure.

Unlike the embodiment shown in FIG. 5, the incident light in this embodiment enters an FP-LD via a coupler 71 instead of a circulator. On one hand, the coupler 71 imports the incident light into the FP-LD in a proportion (for example, 50%), and on the other hand, the coupler 71 exports the output light of the FP-LD in a proportion for making a detection about an output optical power.

In this embodiment, a PD disposed at an exterior of the laser is employed. As shown in FIG. 7, the optical power of the light exported by the coupler 71 is detected by a PD 72. The PD 72 converts the optical power of the light exported by the coupler 71 into a current signal and sends the current signal to an amplifier 73 connected to the PD 72. A transimpedance amplifier inside the amplifier 73 amplifies and converts the current signal into a voltage signal. The voltage signal is output to a signal processing unit 52. The processing performed by the signal processing unit 52 on the voltage signal is the same as that in the embodiment shown in FIG. 5, which will not be described herein again.

4) A Fourth Embodiment: A Digital Signal Processing Unit and a PD are Employed.

Figure 8:
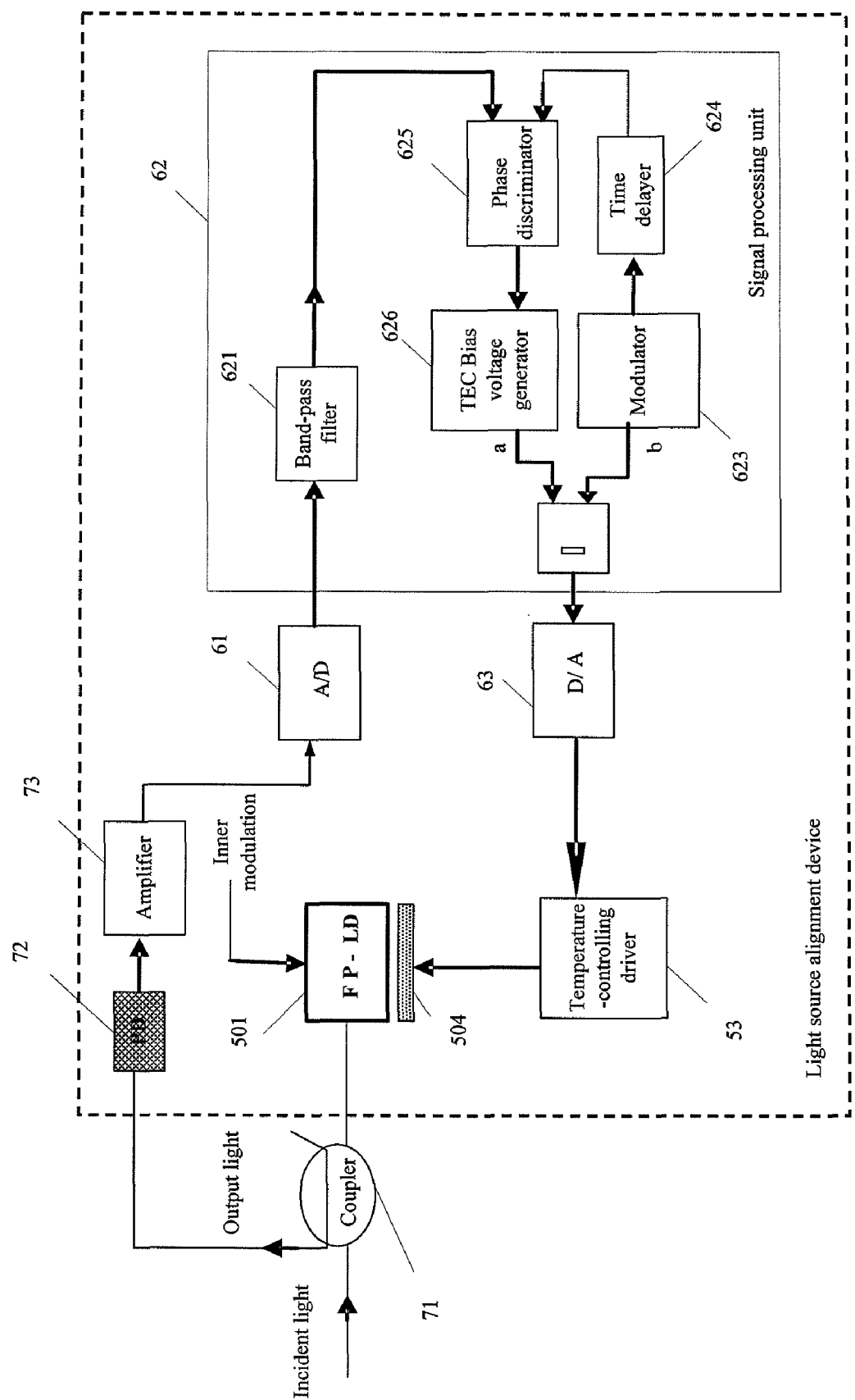
FIG. 8 is a structural view of a light source mode alignment device according to a forth embodiment of the present disclosure.

FIG. 8 is a structural view of a light source mode alignment device according to a fourth embodiment of the present disclosure.

Unlike the embodiment shown in FIG. 6, the incident light in this embodiment enters an FP-LD via a coupler 71 instead of a circulator. On one hand, the coupler 71 imports the incident light into the FP-LD in a proportion (for example, 50%), and on the other hand, the coupler 71 exports the output light of the FP-LD in a proportion for making a detection about an output optical power.

In this embodiment, a PD disposed at an exterior of the laser is employed. As shown in FIG. 8, the optical power of the light exported by the coupler 71 is detected by a PD 72. The PD 72 converts the optical power of the light exported by the coupler 71 into a current signal. The current signal is sampled by an A/D module 61 to obtain a digitized power signal. Afterwards, the digitized power signal is sent to a signal processing unit 62 for digital signal processing. The subsequent processing procedures are the same as those in the embodiment shown in FIG. 6, which will not be described herein again.

In the embodiment of the present disclosure, an automatic alignment (without a manual calibration) between the wavelength and the longitudinal mode of the laser is realized at a low cost (a common AWG not limited to an athermal AWG; may be used), so as to compensate influences brought by the temperature variation. Moreover, under the interferences of an optical power drift and a wavelength drift resulted from various factors, the present disclosure can still realize the mode alignment because the phase information of the signals is used, which has a strong anti-interference capability.

In the embodiments of the present disclosure, standard components of a semiconductor laser module in the prior art, such as the LD, TEC, MPD or PD, are employed, without increasing the cost, and commonly-used function modules are employed for the signal processing operation. Therefore, the cost of the entire device is almost the same as that of an optical transmitter module in the prior art.

Because the device according to the embodiments of the present disclosure can automatically seek for a position of a main longitudinal mode corresponding to the wavelength of the incident light, merely a common temperature-sensitive AWG is needed. Moreover, the AWG is not required to have a temperature control function, which has a much lower cost than products in the prior art.

Because the device according to the embodiments of the present disclosure can automatically align the modes, a power threshold of the incident light is reduced, i.e., the required power of a broad-band light source as the incident light source is reduced, thereby reducing the cost of the broad-band light source.

If the wavelength of the incident light is aligned with a valley between the longitudinal modes at the very beginning, the IPM is equal to 0, and the above algorithm is locked at the valley in a deadlock. Three methods may be employed in the embodiments of the present disclosure to avoid the deadlock.

The first method is a temperature scanning method. Temperatures of the LD are generally scanned in a large range before the adaptive adjustment is performed and a temperature corresponding to a maximum output power is selected as an initial temperature. After the initial temperature is adjusted, the alignment between the longitudinal mode and the wavelength of the incident light can be ensured throughout the working period of the LD by means of temperature modulation.

Figure 9:
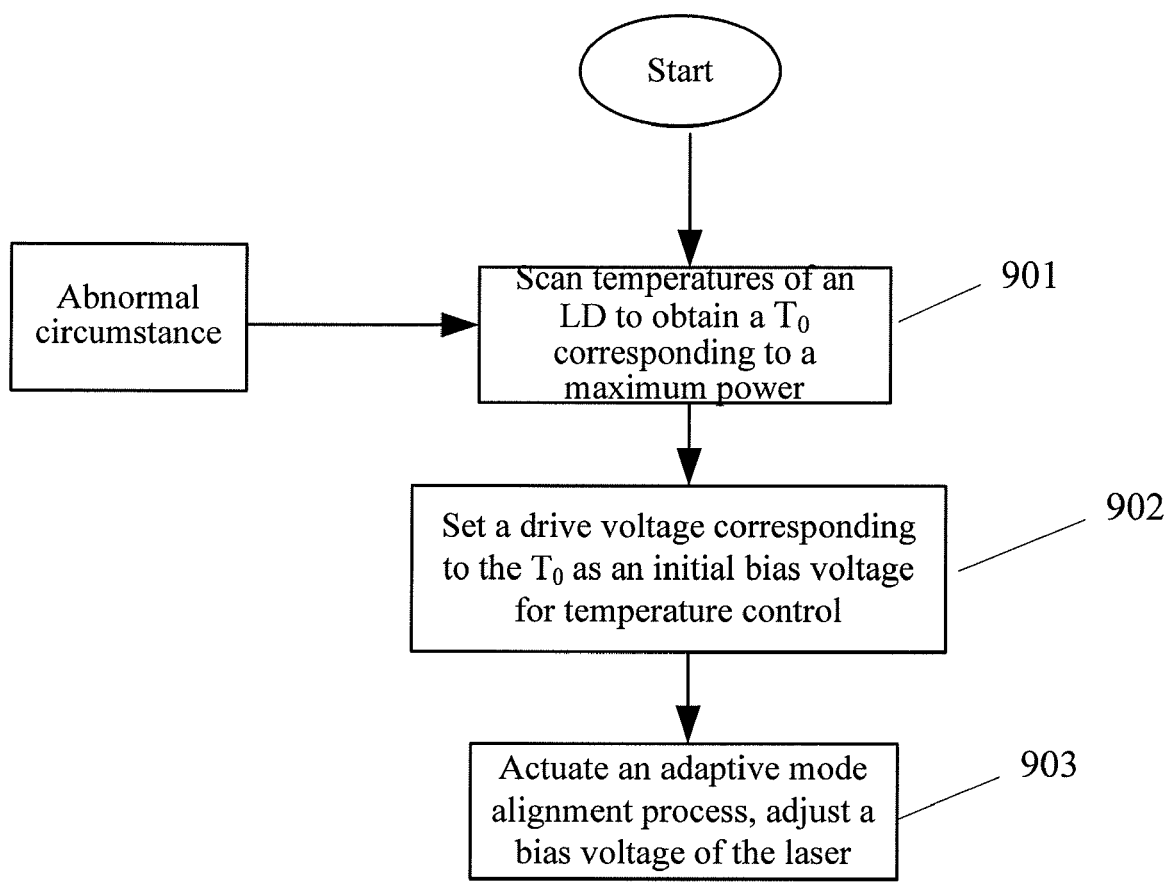
FIG. 9 is a flow chart of a temperature scanning method for preventing a deadlock according to an embodiment of the present disclosure.

Referring to FIG. 9, the temperature scanning method specifically includes the following steps.

In Step 901, scanning temperatures of an FP-LD laser to obtain a temperature $T_0$ corresponding to a maximum power of the laser.

In Step 902, setting a drive voltage corresponding to the $T_0$ as an initial bias voltage for temperature control.

In Step 903, starting an adaptive mode alignment process.

Figure 10:
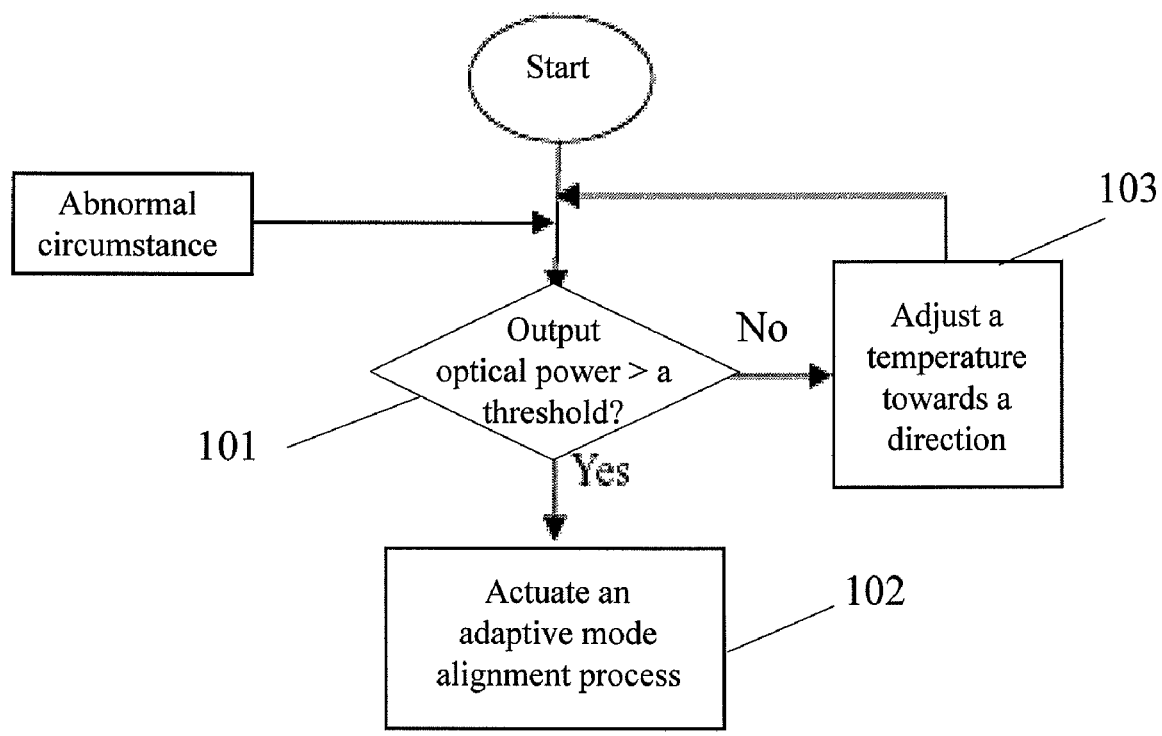
FIG. 10 is a flow chart of a power threshold determination method for preventing a deadlock according to an embodiment of the present disclosure.

The second method is a power threshold determination method. Referring to FIG. 10, when the wavelength of the incident light corresponds to the valley, the output power is obviously lower than that achieved when the wavelength is aligned with the longitudinal mode. If the output power is lower than a threshold, the wavelength of the incident light is determined to correspond to the proximity of the valley, and the temperature is adjusted, so that the output power is higher than the threshold. In this way, the wavelength of the incident light is made to correspond to the proximity of the center of the longitudinal mode, and the adaptive mode alignment process is started, so as to avoid the deadlock at the valley.

Referring to FIG. 10, the power threshold determination method specifically includes the following steps.

In Step 101, determining whether an optical power output by an FP-LD laser is greater than a set threshold or not, and if yes, Step 102 is performed; otherwise, Step 103 is performed.

In Step 102, starting an adaptive mode alignment process.

In Step 103, adjusting a temperature towards a direction.

Figure 11:
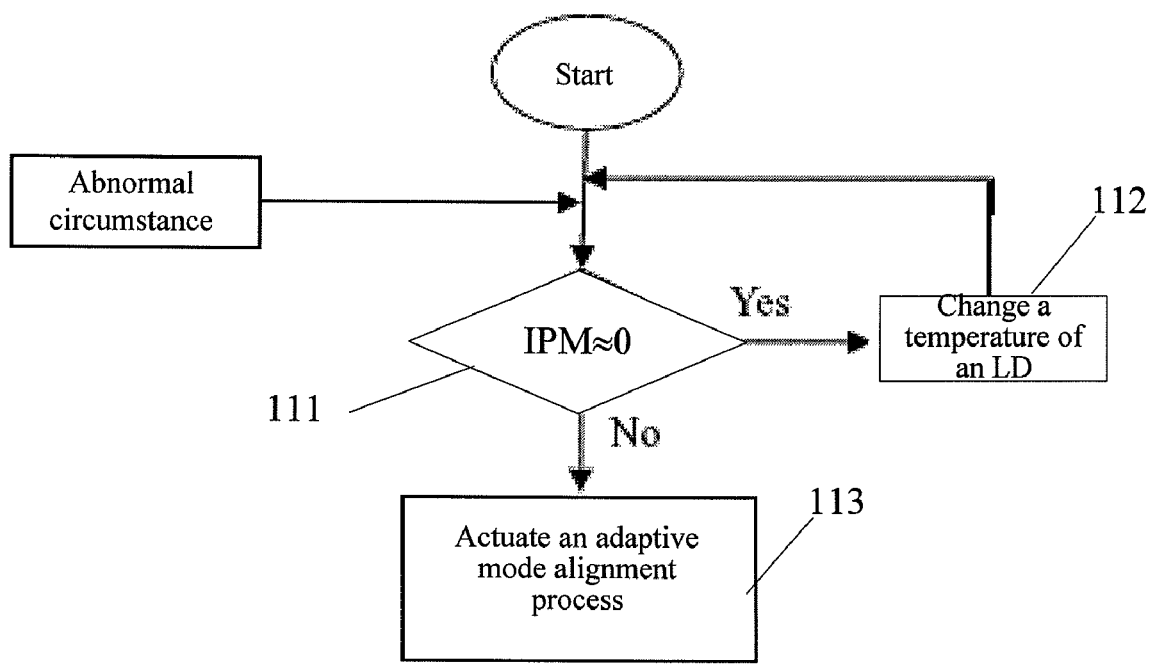
FIG. 11 is a flow chart of a disturbance interference method for preventing a deadlock according to an embodiment of the present disclosure.

The third method is a perturbation method. Referring to FIG. 11, if the IPM value is 0 at the very beginning of the adaptive mode alignment process, a small temperature deviation is added randomly, so that the IPM value is not 0. In this way, the adjustment can be made towards the center of the mode in the feedback process.

Referring to FIG. 11, the perturbation method specifically includes the following steps.

In Step 111, determining whether the IPM value is 0 or not, and if yes, Step 112 is performed; otherwise, Step 113 is performed.

In Step 112, adjusting a temperature of an FP-LD laser (a small temperature deviation is selected randomly).

In Step 113, starting an adaptive mode alignment process.

The light source mode alignment device according to the embodiment of the present disclosure may be applied in a wavelength division multiplexer passive optical network (WDM-PON) system, and used as a light source in an optical line terminal (OLT) and/or an optical network unit (ONU) of the WDM-PON system, which is capable of ensuring the stability of the output power of the light source, so that the WDM-PON system can operate reliably.

Figure 12:
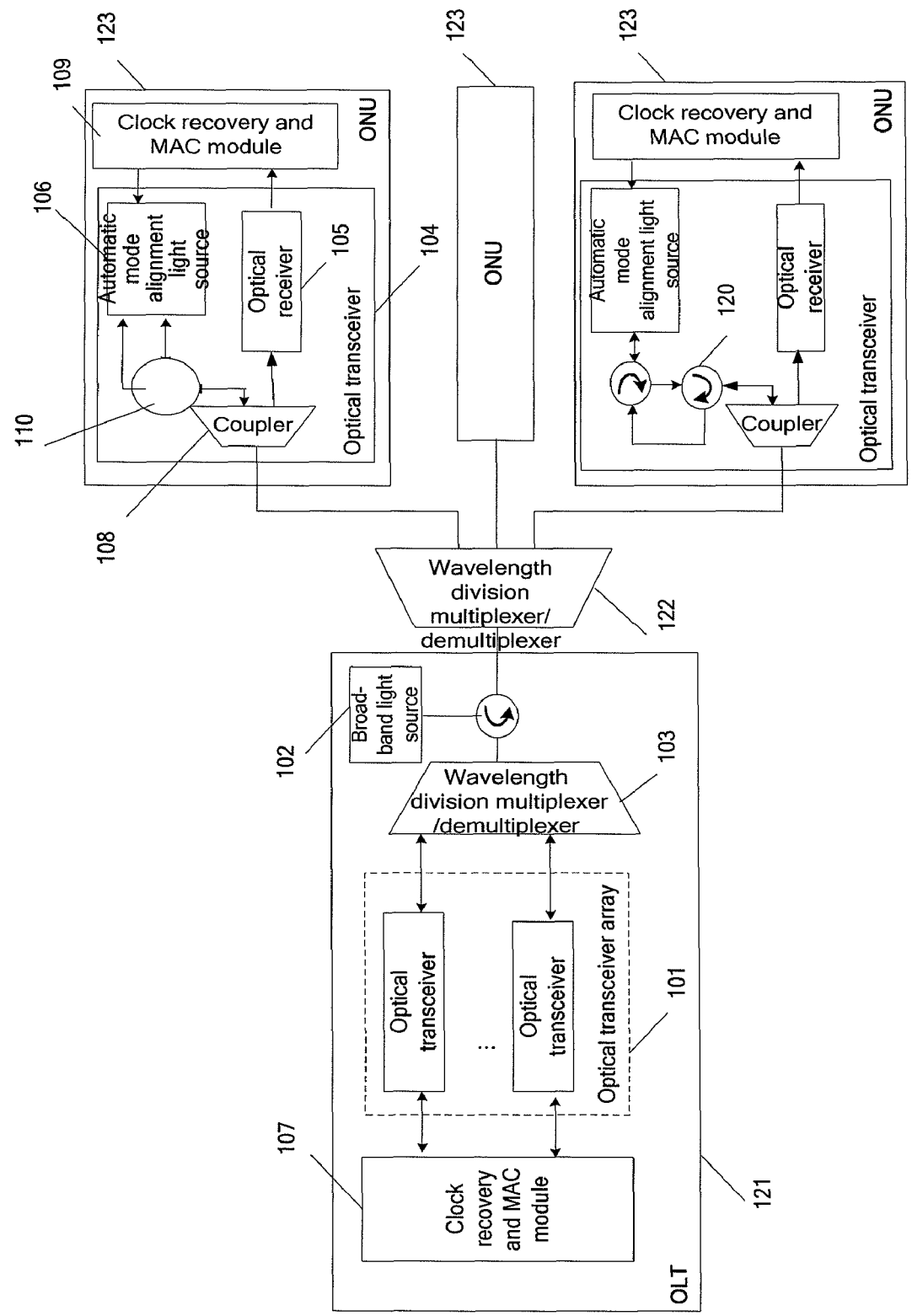
FIG. 12 is a structural view of a first embodiment of a WDM-PON system according to the present disclosure.

FIG. 12 is a structural view of a first embodiment of a WDM-PON system adopting the present disclosure.

The system is based on a wavelength division multiplexer/demultiplexer. As shown in FIG. 12, an OLT 121 achieves a data exchange with an ONU 123 via a passive optical distribution network (ODN) based on a second wavelength division multiplexer/demultiplexer 122.

In a downlink direction, an optical transceiver array 101 in the OLT 121 modulates downlink data to an optical signal sent from a broad-band light source 102 via a first wavelength division multiplexer/demultiplexer 103 in the OLT 121, and transmits the modulated downlink data optical signal to the ONU 123 via the first wavelength division multiplexer/demultiplexer 103 and the passive ODN. The ONU 123 receives the downlink data by an optical receiver 105 in an optical transceiver 104.

In an uplink direction, the ONU 123 modulates uplink data to an optical signal of an uplink wavelength via an automatic mode alignment light source 106, and transmits the signal to the OLT 121 via the passive ODN. The optical transceiver array 101 in the OLT 121 converts the uplink data optical signal received via the first wavelength division multiplexer/demultiplexer 103 into an uplink data electrical signal and transmits the uplink data electrical signal to a clock recovery and MAC module 107 in the OLT 121.

There are two basic circumstances according to the basic characteristic whether the system uses the same wavelength in the uplink and downlink directions or not. 1) In the case that the uplink adopts a wavelength different from that of the downlink, the broad-band light source 102 provides an optical signal of the uplink wavelength for the ONU 123 via the passive ODN, while providing an optical signal of the downlink wavelength for the transceiver array 101. 2) In the case that the uplink adopts the downlink wavelength, the broad-band light source 102 only provides an optical signal for the transceiver array 101.

For the above circumstance of 1), a coupler 108 in the ONU 123 employs a WDM coupler (i.e., a wave separator). Therefore, in the downlink direction, the optical receiver 105 in the optical transceiver 104 of the ONU 123 extracts and uses the downlink data optical signal modulated by the downlink wavelength via the wave separator, converts the downlink data optical signal into a downlink data electrical signal, and transmits the downlink data electrical signal to a clock recovery and MAC module 109 for a clock recovery and for further protocol processing. In the uplink direction, the automatic mode alignment light source 106 in the optical transceiver 104 of the ONU 123 receives the optical signal of the uplink wavelength from the wave separator via a 1:2 optical splitter 110 (corresponding to the third and fourth embodiments of the light source mode alignment device of the present disclosure) or a second circulator 120 (corresponding to the first and second embodiments of the light source mode alignment device of the present disclosure), and modulates the uplink data received from the clock recovery and MAC module 109 to the optical signal of the uplink wavelength, and finally sends the modulated uplink data optical signal to the OLT 121 via the passive ODN.

For the above circumstance of 2), the coupler 108 of the ONU 123 employs a bi-directional optical power coupler (i.e., 1:2 optical splitter). The processing procedures on the optical signal in the downlink direction are the same as that in the above circumstance of 1), and the processing procedures on the optical signal in the uplink direction are similar to that in the above circumstance of 1), in which the main difference there-between lies in that the uplink data is modulated to the optical signal with the same wavelength as the downlink wavelength.

In addition, the optical transceiver array 101 in the OLT 121 may also employ the automatic mode alignment light source in the embodiment of the present disclosure. The principle and process of modulating data and receiving data are the same as that of the automatic mode alignment light source 106 in the ONU 123 and thus will not be described again.

Figure 13:
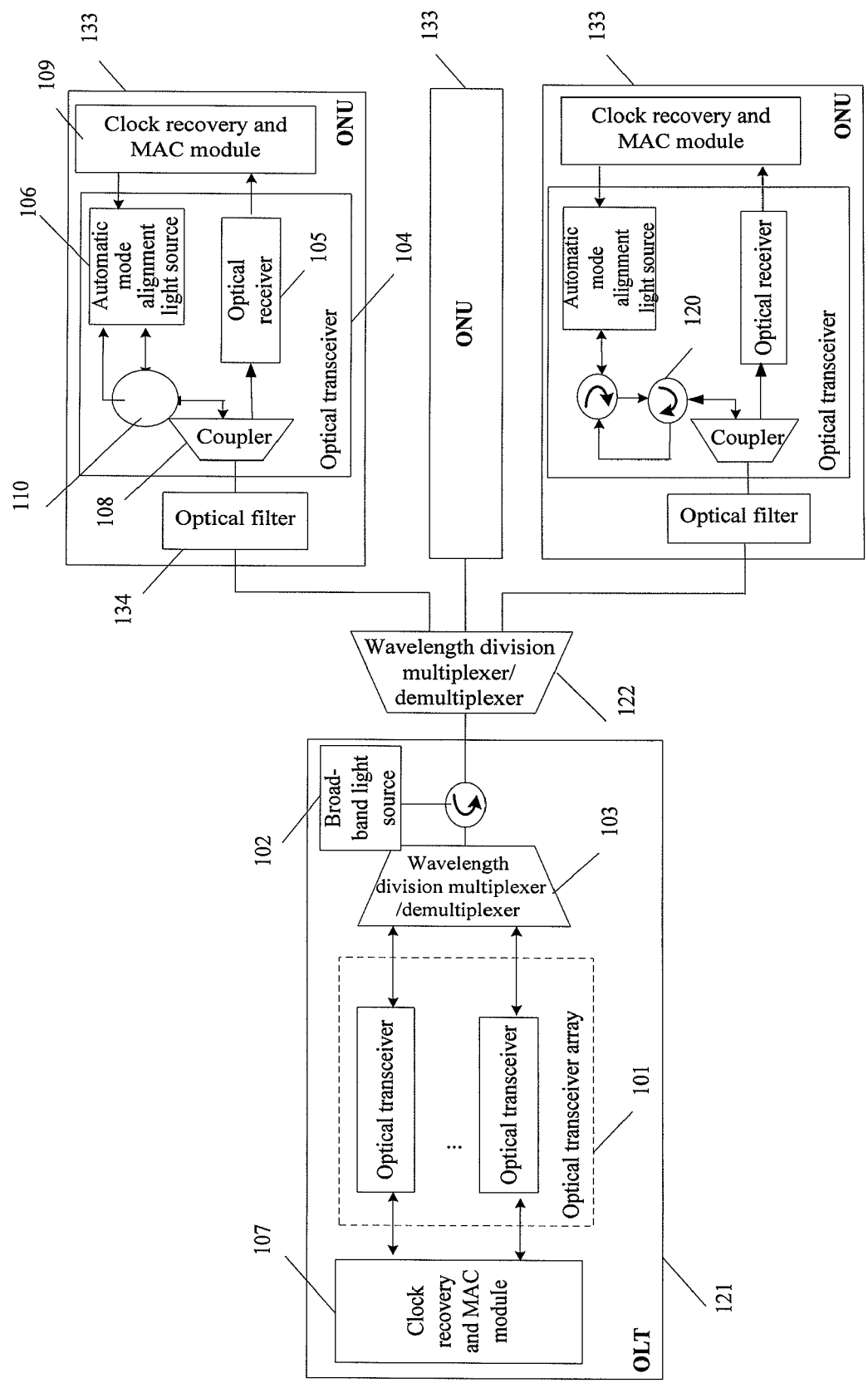
FIG. 13 is a structural view of a second embodiment of a WDM-PON system according to the present disclosure.

FIG. 13 is a structural view of a second embodiment of a WDM-PON system employing the present disclosure.

The system is based on a wavelength division multiplexer/demultiplexer. As shown in FIG. 13, an OLT 121 achieves a data exchange with an ONU 133 via a passive ODN based on an optical splitter 132.

This embodiment is substantially the same as the first embodiment shown in FIG. 12. The difference there-between lies in that, an optical filter 134 for extracting optical signals of uplink and downlink wavelengths distributed to specific ONUs needs to be added in the ONU 133, because the passive ODN based on the optical splitter is employed.

The process for the OLT 121 to perform the data exchange with the ONU 133 via the passive ODN based on the optical splitter 132 is similar to that in the embodiment shown in FIG. 12 and thus will not be described again.

The above descriptions are merely preferred embodiments of the present disclosure, but not intended to limit the present disclosure. Various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A light source mode alignment device, comprising: a laser, a signal processing unit, and a temperature control unit,
   wherein the laser is configured to convert an incident light into a current signal, amplify the current signal and convert the amplified current signal into a voltage signal;
   wherein the signal processing unit is configured to obtain a voltage signal containing power fluctuation information according to the voltage signal from the laser; wherein the signal processing unit further comprises a modulator, a phase discriminator, and a bias voltage generator;
   wherein the modulator is configured to generate a modulation signal;
   the phase discriminator, configured to generate the integral value of a product of multiplying the voltage signal of the signal procession unit and the modulation signal of the modulator and output the integral value to the bias voltage generator;
   wherein the bias voltage generator is configured to output bias voltage according to the integral value;

wherein the temperature control unit is connected to the laser, configured to generate a voltage through a weighted addition operation between the bias voltage output by the bias voltage generator and the modulation signal generated by the modulator, and apply the voltage to the laser to control temperature of the laser.

2. The light source mode alignment device according to claim 1, wherein the laser is a Fabry Perot laser diode (FP-LD) laser.

3. The light source mode alignment device according to claim 2, wherein the laser is provided with a photo-electric detector therein, and the photo-electric detector is adapted to convert the incident light into the current signal.

4. The light source mode alignment device according to claim 1, wherein the signal processing unit further comprises: an amplifier and a filter the filter is configured to filter the voltage signal for a band-pass filtering and obtain a voltage signal containing power fluctuation information; and then the amplifier is configured to dynamically amplify the voltage signal containing power fluctuation, and output the voltage signal containing power fluctuation to the phase discriminator.

5. The light source mode alignment device according to claim 4, wherein the signal processing unit further comprises a time delayer;
the time delayer, configured to delay the modulation signal generated by the modulator, and input the delayed modulation signal into the phase discriminator.

6. The light source mode alignment device according to claim 1, wherein the temperature control unit comprises a thermal electric control (TEC), a thermistor, and a temperature-controlling driver, a control voltage is applied to the TEC via the temperature-controlling driver, the voltage signal is converted into a digital signal by an analog-to-digital (A/D) converter, and the digital signal is converted into an analog signal by a digital-to-analog (D/A) converter after a digital signal processing, and then transmitted to the temperature control unit.

7. A light source mode alignment device, comprising: a laser, a photo-electric detector, a signal processing unit and a temperature control unit, wherein the photo-electric detector, configured to convert an optical signal in an output light into a current signal;
the laser, configured to amplify the current signal and convert the amplified current signal into a voltage signal;
the signal processing unit, configured to obtain a voltage signal containing power fluctuation information according to the voltage signal from the laser; wherein the signal processing unit further comprises a modulator, a phase discriminator, and a bias voltage generator;
the modulator, configured to generate a modulation signal;
the phase discriminator, configured to generate the integral value of a product of multiplying the voltage signal of the signal procession unit and the modulation signal of the modulator output the integral value to the bias voltage generator;
the bias voltage generator, configured to output the bias voltage according to the integral value;
the temperature control unit, connected to the laser, configured to generate a voltage through a weighted addition operation between the bias voltage output by the bias voltage generator and the modulation signal generated by the modulator, and apply the voltage to the laser to control a temperature of the laser.

8. The light source mode alignment device according to claim 7, wherein the laser is a Fabry Perot laser diode (FP-LD) laser; the signal processing unit further comprises: an amplifier and a filter, the filter is configured to filter the voltage signal for a band-pass filtering and obtain a voltage signal containing power fluctuation information; and then the amplifier is configured to dynamically amplify the voltage signal containing power fluctuation, and output the voltage signal containing power fluctuation to the phase discriminator.

9. The light source mode alignment device according to claim 8, wherein the signal processing unit further comprises a time delayer; the time delayer, configured to delay the modulation signal generated by the modulator, and input the delayed modulation signal into the phase discriminator.

10. The light source mode alignment device according to claim 7, wherein the temperature control unit comprises a thermal electric control (TEC), a thermistor, and a temperature-controlling driver, a control voltage is applied to the TEC via the temperature-controlling driver, the voltage signal is converted into a digital signal by an analog-to-digital (A/D) converter, and the digital signal is converted into an analog signal by a digital-to-analog (D/A) converter after a digital signal processing, and then transmitted to the temperature control unit.

11. A light source mode alignment method, comprising:
generating a power fluctuation signal of an incident light and modulation signal respectively;
obtaining a phase relation between the power fluctuation signal and the modulation signal; and
adjusting a bias voltage of a laser according to the phase relation.

12. The light source mode alignment method according to claim 11, further comprising:
generating a control voltage by the bias voltage and the temperature modulate signal, and applying the control voltage to a temperature control unit of the laser.

13. The light source mode alignment method according to claim 11, wherein the generating the power fluctuation signal of the incident light of the laser further comprises:
converting the incident light into a voltage signal and performing a band-pass filtering on the voltage signal; and
dynamically amplifying the filtered voltage signal to generate the power fluctuation signal.

14. The light source mode alignment method according to claim 13, wherein an amplitude of the amplified voltage signal is consistent with that of the modulate signal.

15. The light source mode alignment method according to claim 11, wherein the generating the modulate signal further comprises:
generating the modulate signal by a modulate signal generator; and
delaying the modulate signal by a time delayer.

16. The light source mode alignment method according to claim 11, wherein the obtaining the phase relation between the power fluctuation signal and the modulate signal further comprises: performing a multiplication and an integration on the power fluctuation signal and the modulate signal by a phase discriminator to obtain an integral value of the multiplication that reflects the phase relation between the two signals.

17. The light source mode alignment method according to claim 16, wherein the adjusting the bias voltage of the laser according to the phase relation further comprises:
increasing the bias voltage if the integral value is greater than zero; and
decreasing the bias voltage if the integral value is smaller than zero.

18. The light source mode alignment method according to claim 17, wherein an adjustment amount for increasing or decreasing the bias voltage is determined based on the following equation:

$$\Delta V = \frac{IPM}{c \cdot t},$$

wherein $\Delta V$ denotes the adjustment amount of the bias voltage, IPM denotes an integral value of a product of multiplying the power signal by the modulate signal after a second amplification, c denotes a constant, and t denotes a time; or the adjustment amount for increasing or decreasing the bias voltage is determined based on the following equation:

$$\Delta V = A \cdot IPM + B \cdot \frac{d}{dt}(IPM) + C \cdot \int_{t0}^{t} IPM\, dt,$$

wherein $\Delta V$ denotes the adjustment amount of the bias voltage, IPM denotes an integral value of a product of multiplying the power signal by the modulate signal after a second amplification, t denotes a time, and A, B, and C are constants.

19. The light source mode alignment method according to claim 11, wherein before the generating the power fluctuation signal of the incident light of the laser and the modulate signal respectively, the method further comprises:
scanning temperatures of the laser and selecting a temperature corresponding to a maximum output power of the laser as an initial temperature; or
adjusting a temperature of the laser to enable an output power of the laser to be higher than a set threshold; or
applying a temperature deviation to the laser randomly to make a wavelength of the incident light correspond to a proximity of a center of a longitudinal mode of the laser.

20. A passive optical network (PON) system, comprising: an optical line terminal (OLT), an optical distribution network (ODN), and an optical network unit (ONU), wherein the OLT and/or the ONU comprises an adaptive mode alignment light source;
wherein the adaptive mode alignment light source comprises a laser, a signal processing unit, and a temperature control unit,
wherein the laser is configured to convert an incident light into a current signal, amplify the current signal and convert the amplified current signal into a voltage signal;
wherein the signal processing unit is configured to obtain a voltage signal containing power fluctuation information according to the voltage signal from the laser; wherein the signal processing unit further comprises a modulator, a phase discriminator, and a bias voltage generator;
wherein the modulator is configured to generate a modulation signal;
wherein the phase discriminator is configured to generate the integral value of a product of multiplying the voltage signal of the signal procession unit and the modulation signal of the modulator and output the integral value to the bias voltage generator;
wherein the bias voltage generator is configured to output the bias voltage according to the integral value;
wherein the temperature control unit is connected to the laser, configured to generate a voltage through a weighted addition operation between the bias voltage output by the bias voltage generator and the modulation signal generated by the modulator, and apply the voltage to the laser to control a temperature of the laser.

21. A passive optical network (PON) system, comprising: an optical line terminal (OLT), an optical distribution network (ODN), and an optical network unit (ONU), wherein the OLT and/or the ONU comprises an adaptive mode alignment light source;
wherein the adaptive mode alignment light source comprises a laser, a photo-electric detector, a signal processing unit, and a temperature control unit;
wherein the photo-electric detector is configured to convert an optical signal in an output light into a current signal;
wherein the laser is configured to amplify the current signal and converted the amplified current signal into a voltage signal;
wherein the signal processing unit is configured to obtain a voltage signal containing power fluctuation information according to the voltage signal from the laser;
wherein the signal processing unit further comprises a modulator, a phase discriminator, and a bias voltage generator;
wherein the modulator is configured to generate a modulation signal;
wherein the phase discriminator is configured to output the integral value of a product of multiplying the voltage signal of the signal procession unit and the modulation signal of the modulator to the bias voltage generator;
wherein the bias voltage generator is configured to output the bias voltage according to the integral value;
wherein the temperature control unit is connected to the laser, configured to generate a voltage through a weighted addition operation between the bias voltage output by the bias voltage generator and the modulation signal generated by the modulator, and apply the voltage to the laser to control a temperature of the laser.

* * * * *